(12) United States Patent
Boersma et al.

(10) Patent No.: US 12,287,285 B2
(45) Date of Patent: Apr. 29, 2025

(54) HOLLOW WAVEGUIDE FOR GAS DETECTION

(71) Applicant: Nederlandse Organisatie voor toegepast-natuurwetenschappelijk onderzoek TNO, 's-Gravenhage (NL)

(72) Inventors: Arjen Boersma, Haaren (NL); Javier Nunez Villanueva, Eindhoven (NL); Evert Jonathan Van Den Ham, Wijk en Aalburg (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 138 days.

(21) Appl. No.: 18/011,570

(22) PCT Filed: Jun. 24, 2021

(86) PCT No.: PCT/NL2021/050400
§ 371 (c)(1),
(2) Date: Dec. 20, 2022

(87) PCT Pub. No.: WO2021/262004
PCT Pub. Date: Dec. 30, 2021

(65) Prior Publication Data
US 2023/0324288 A1    Oct. 12, 2023

(30) Foreign Application Priority Data

Jun. 24, 2020   (EP) ..................................... 20182025

(51) Int. Cl.
*G01N 21/3504*      (2014.01)
*C03C 25/106*       (2018.01)

(52) U.S. Cl.
CPC ..... *G01N 21/3504* (2013.01); *C03C 25/1061* (2018.01); *G01N 2201/061* (2013.01); *G01N 2201/0873* (2013.01)

(58) Field of Classification Search
CPC ............. G01N 21/3504; G01N 21/031; G01N 2201/061; G01N 2201/0873;
(Continued)

(56) References Cited

U.S. PATENT DOCUMENTS 5,745,231 A    4/1998  Groger et al.
5,904,983 A *  5/1999  Chan ................... C03C 25/1065
                                                    428/389

(Continued)

FOREIGN PATENT DOCUMENTS

EP    0886141 A1    12/1998
EP    0909946 A2    4/1999
(Continued)

OTHER PUBLICATIONS

M. Karlowatz et al., "Simultaneous Quantitative Determination of Benzene, Toluene, and Xylenes in Water Using Mid-Infrared Evanescent Field Spectroscopy," Analytical Chemistry 2004, vol. 76, No. 9, pp. 2643-2648, May 1, 2004.
(Continued)

*Primary Examiner* — Tarifur R Chowdhury
*Assistant Examiner* — Carlos Perez-Guzman
(74) *Attorney, Agent, or Firm* — Leydig, Voit & Mayer, Ltd.

(57) ABSTRACT

A sensor system, the manufacturing of such system, and the use of such system for optical detection of a target analyte in a gaseous medium are described. The sensor system includes a hollow waveguide that is provided with a reflective mirror layer along its inner wall and a concentrating coating of an inorganic sorption material. The mirror layer
(Continued)

defines a light path for guiding light between a light inlet and a light outlet that are provided on opposing terminal ends of the hollow waveguide. The concentrating coating increases an effective concentration of target analytes, if present, and allows optical, preferably spectroscopic, analysis of the medium by recording transmission of light, preferably infrared light, guided through the hollow waveguide.

13 Claims, 7 Drawing Sheets

(58) Field of Classification Search
 CPC ...... G01N 2021/0346; G01N 2021/052; C03C 25/1061
 See application file for complete search history.

(56) References Cited

U.S. PATENT DOCUMENTS

| | | | |
|---|---|---|---|
| 5,957,858 | A | 9/1999 | Micheels et al. |
| 6,801,677 | B1 | 10/2004 | Grace et al. |
| 8,638,440 | B1* | 1/2014 | Ohodnicki, Jr. ..... G01N 21/783 356/445 |
| 9,921,164 | B2 | 3/2018 | Lu |
| 2012/0170023 | A1* | 7/2012 | Szobota ............... G01N 21/552 356/51 |
| 2013/0081447 | A1* | 4/2013 | Carter .................... G01N 21/05 73/30.01 |
| 2014/0321798 | A1 | 10/2014 | Chen et al. |
| 2018/0156715 | A1 | 6/2018 | Francis et al. |
| 2020/0017409 | A1* | 1/2020 | Chen .................... G01N 21/774 |
| 2022/0099489 | A1* | 3/2022 | Weidmann ................ G01J 3/18 |

FOREIGN PATENT DOCUMENTS

| | | |
|---|---|---|
| EP | 1625386 A4 | 5/2007 |
| EP | 2232246 B1 | 11/2020 |
| WO | WO 92/15862 A1 | 9/1992 |
| WO | WO 97/35181 A1 | 9/1997 |
| WO | WO 2009/082213 A1 | 7/2009 |
| WO | WO 2014151309 A1 | 9/2014 |
| WO | WO 2018/152479 A1 | 8/2018 |
| WO | WO 2019/170884 A1 | 9/2019 |

OTHER PUBLICATIONS

Pao Tai Lin et al., "Label-free water sensors using hybrid polymer-dielectric mid-infrared optical waveguides," ACS Applied Materials and Interfaces 2015, 7, pp. 11189-11194.

Charles Heath et al., "The Effect of Pressure and Temperature on Mid-Infrared Sensing of Dissolved Hydrocarbons in Water," Analytical Chemistry 2017, 89, pp. 13391-13397.

Kewang Chen et al., "Characterization of gas absorption modules based on flexible mid-infrared hollow waveguides," Sensors 2019, 19, pp. 1698.

Florian Rauh et al., "A mid-infrared sensor for the determination of perfluorocarbon-based compounds in aquatic systems for geosequestration purposes," Talanta 130 (2014), pp. 527-535.

European Patent Office, International Search Report in corresponding International Application No. PCT/NL2021/050400, dated Jul. 22, 2021 (3 pages).

J.A. Harrington, "Infrared Hollow Waveguides: An Update," Proceedings of SPIE, vol. 6852, pp. 68520M-1 to 68520M-8, XP055745047 (Feb. 7, 2008).

W. Kendall et al., "Silver/Polymer Coated Hollow Glass Waveguides for Mid-IR Transmission," Progress in Biomedical Optics and Imaging, SPIE—International Society for Optical Engineering, vol. 10058, pp. 100580Z-1 to 100580Z-16, XP060084195 (Feb. 28, 2017).

Carlos M. Bledt et al., "Dielectric II-VI and IV-VI Metal Chalcogenide Thin Films in Silver Coated Hollow Glass Waveguides (HGWS) for Infrared Spectroscopy and Laser Delivery," Advances and Applications in Electroceramics II, pp. 3-12, XP055744938 (2012).

* cited by examiner

HOLLOW WAVEGUIDE FOR GAS DETECTION

CROSS-REFERENCE TO RELATED APPLICATIONS

This patent application is a U.S. National Phase of PCT International Application No. PCT/NL2021/050400, filed Jun. 24, 2021, which claims priority to European Application No. 20182025.5, filed Jun. 24, 2020, which are both expressly incorporated by reference in their entireties, including any references contained therein.

TECHNICAL FIELD AND BACKGROUND

The present disclosure relate to a sensor system, the manufacturing of such system, and the use of such system for optical detection of a target analyte in a fluid medium. In particular, the present disclosure relates to a hollow waveguide for detection of a target analyte in a gaseous medium.

Measuring very low concentrations of gasses and/or contaminants in gasses or liquids typically requires very expensive and/or large hardware. In view of the increasing requirements for environmental quality and personal protection, the permanent monitoring of air and water quality is generating more attention and importance. However, this also requires more sensitive, smaller and lower cost detection hardware than currently available.

Existing solutions include laboratory setups such as GC-MS, cavity ringdown spectrometers, and tunable laser spectrometers. These existing solutions are generally expensive, large, and/or less suitable for portable, e.g. on-site measurements. Inexpensive solutions such as metal oxide or electrochemical gas sensors typically have relatively poor selectivity for the compounds to be detected. Inventors are not aware of any commercially available, small, multiparameter sensors that can selectively measure gasses at ppb level.

Infrared solutions are known to offer good selectivity, but these typically require a long path length and/or prolonged sampling accompanied with pre-concentration procedures to enable analytes of interest to be detected at low concentrations.

Hollow waveguides can be used in to guide infrared light and/or as sampling space. A scientific publication by Kendall et al (Progress in Biomedical Optics and Imaging—Proceedings of SPIE 10058,(2017) 100580Z) describe the use of silver/polymer coated hollow glass waveguides for mid-IR transmission. Poly(methyl methacrylate), polyethylene, and Chemours™ Teflon™ AF layers have been tested as dielectric films and straight and bending losses of the coated waveguide were measured. Yang et al (Yang J, Her J W (2000) Anal Chem 72:878) reports recording FT-IR spectra of 1-chloronaphthalene, chlorobenzene, and 2-chlorotoluene using a PIB polymer coated hollow waveguide. The waveguide is connected at one end to an infrared (IR) light source and at the other end to an IR detector. The gas flows through the hollow waveguide. The analyte is detected by IR spectroscopy. Sensitivity and selectivity is limited due to high optical transmission losses believed to be due to interaction of infrared light with the waveguide and/or due to polymer specific absorption bands. Micheels et al (Micheels RH, Eng 3540:64) report recording FT-IR absorption spectra of volatile organic vapors in the headspace of water at the ppm level using a hollow waveguide with an internal polymer coating. To achieve sufficiently long optical pathlength a half-turn coiled waveguide with a length of one meter was used.

SUMMARY

The present disclosure aims to provide a sensor system for optical detection of one or more target analyte in a fluid medium, having improved sensitivity and/or selectivity, and/or reduced size over known sensor systems. The sensor system as disclosed achieves these or other benefits as disclosed herein. The sensor system comprises a hollow waveguide that has an elongate interior space (a hollow core). The elongate interior space is confined by an inner wall of the hollow waveguide. The hollow waveguide defines an elongate interior space for guiding light between a light inlet and a light outlet and for holding and/or guiding the medium to be analyzed, e.g. between a gas inlet and a gas outlet. Guiding light along a volume, e.g. within the elongate interior space, that holds the gaseous medium allows light to interact with compounds comprised in the gaseous medium, e.g. a target analyte.

The sensor system uses optical spectroscopic sensing principles, typically infra read spectroscopy or vibrational spectroscopy. Preferably infrared (IR) spectroscopy, most preferably at the mid-IR range (MIR), which is known to offer highly selective chemical sensing. Typically, the system includes a broadband light source and a broadband detector. Optionally, the system can include a single mode, or frequency scanning, light source and/or light detector. The light source, e.g. a broadband MIR light source, is coupled to one end of the elongate interior space of the waveguide, e.g. via the light inlet. The other end of the elongate interior space end is typically connected to a corresponding broadband detector, e.g. via the light outlet. Typically, the system also comprises a controller for controlling the light source and/or the light detector and/or for recording light absorption, e.g. absorption spectra from light after traveling through the elongate interior space. Advantageously, many target analytes comprise analyte specific absorption bands, allowing quantification (e.g. by relative absorption peak intensity) and/or identification of one or more target analytes within a gaseous medium comprising a complex mixture of components. Alternatively, or in addition to infra-red, the sensor system can be arranged to use spectroscopic methods with light at other or further wavelengths ranges, e.g., UV or visible light. The analyte can in principle be any compound having a spectroscopically active group, e.g. a UV absorbing group or IR resonant group. Preferably, the analyte has at least one IR-responsive group such as a polarizable group. The medium can be any gaseous medium, such as air or industrial gas composition. The sensor system can be used to detect the presence and/or concentration of any gaseous or vapor phase compounds such as volatile organic compounds within the gaseous medium. As such the sensor system can be used to monitor air quality, e.g. ambient or indoor air quality, or monitor industrial gas composition, e.g. the presence and/or concentration of a contaminant in hydrogen or natural gas streams. Alternatively, or in addition, the sensor system may be used to monitor other fluid media, such as liquid or supercritical media, contained within the elongate interior space of the hollow waveguide.

The hollow waveguide comprises a reflective mirror layer for reflecting at least a portion of light. The reflective mirror layer is provided along the inner wall of the hollow waveguide and forms a light path for guiding light from the light inlet towards the light outlet while minimizing attenuation of light due to interaction thereof with the inner wall of the hollow waveguide. Advantageously provision of the reflective mirror layer elongates the length of the light path for a given length of the elongate interior space as light is allowed to repeatedly bounce off opposing portions of the mirror layer before leaving the elongate interior space. Preferably, the reflective mirror layer covers essentially the entire distance between the light inlet and the light outlet. Gaps, e.g. areas of the inner wall not coated with a reflective mirror layer may negatively light transmission through the hollow waveguide, e.g. due to scattering and/or absorption. The reflective mirror layer can be coated with a protecting dielectric layer. This layer protect the mirror against erosion and corrosion, and enhances the reflection of light on the inner surface.

The hollow waveguide comprises a concentrating coating of an analyte sorption material that is provided onto at least a part of the reflective mirror layer. When analytes are absorbed onto the coating material, the local analyte concentration increases, thus improving sensor sensitivity. Preferably, the concentrating coating is transparent for light guided through the elongate interior space, at least over a frequency range that is relevant for detection of the target analyte. Preferably, the concentrating coating including an adhesion promotion layer material and/or a corrosion protection layer, if provided, are relatively transparent, at least to mid IR light. For example, one or more, preferably all, of said materials have a attenuation coefficient of less than one per centimeter ($cm^{-1}$), one per decimeter ($dm^{-1}$), or even less than one per meter ($m^{-1}$) over the MID-IR range. Inventors found that a material, e.g. a concentrating coating, that is essentially inorganic of nature, e.g. ceramic, is advantageously sufficiently transparent within the MID-IR range. Preferably, the concentrating coating is essentially formed of an inorganic material for adsorbing the analyte. Inorganic materials can be understood to include oxides and/or hydroxides of metals and/or metalloids, such silica and alumina. Analyte sorption can be a result of analytes interacting, e.g. binding, with surface oxides and/or hydroxides on such materials. By using an inorganic material that is essentially free of polarizable organic functional groups, interaction of the coating with light in relevant spectral regions (e.g. within mid IR) can be minimized. Reducing light absorption within the coating was found to reduce interference (e.g. overlap) of the coating with analyte specific absorption bands, thus improving sensor performance, lowering detection limits and/or detecting the presence and/or concentration of a specific target analyte in a sample comprising a complex mixture gasses or vapors each having specific absorption characteristics.

Preferably, the concentrating coating is arranged for reversibly adsorbing the target analyte from the medium, if present therein. At least a portion, preferably all, of the concentrating coating is provided such that it overlaps with the light path to allow the light to interact with an adsorbed analyte. Absorbing the target analyte with the concentrating coating increases an effective concentration of the analyte within the elongate interior space and along the light path, thus increasing sensitivity of the sensor system and lowering the detection limit of the sensor towards such analytes. Improving sensitivity mitigates a need for sampling and/or pre-concentration as is typically required by conventional off-line analysis methods which typically lack suitable sensitivity for inline detection of analytes, e.g. at typical relevant levels, that are typically in a part-per-billion regime. Providing the sensor system comprising the hollow waveguide as describe herein allows inline detection of a broad range of relevant analytes, reducing cost and/or size of analysis tools (e.g. optical hardware) and/or reducing the sampling length required to attain a given sensitivity. Both the provision of the concentrating coating and the reflective mirror layer are believed to contribute an achieved amplification of a signal, e.g. IR spectrum. Advantageously, the use of a MIR-transparent waveguide that is provided with a layer of a concentrating coating, along which the MIR light is guided from a light source to a detector enables scanning of a chemical fingerprint of the environment. Thus, enabling the detection of multiple constituents comprised in a gaseous medium. In particular, the combined application of various elements as described herein, including the use of the optically transparent concentrating coating in combination with the reflective mirror layer enables the improved detection of target analytes, e.g. air quality monitoring, over known systems.

According to other or further aspects, the present disclosure relates to a method of manufacturing the sensor system as disclosed herein and/or to the use of such systems for detecting of one or more target analyte in a medium. Manufacturing the sensor system comprises at least providing an hollow waveguide, depositing reflective mirror layer along an inner surface of the hollow waveguide, depositing a protective dielectric layer on the inner surface, and depositing an analyte sorption material, preferably an inorganic material, to form a concentrating coating along the reflective mirror layer. The use of a sensor system as disclosed herein for detecting a presence and/or concentration of one or more target analyte in a medium comprises at least guiding the medium to be analyzed through the elongate interior space of the hollow waveguide as disclosed herein, and measuring an absorption, preferably an infrared spectrum, light guided through said waveguide. Preferably the medium is a gaseous medium. Compared to liquid media gaseous media advantageously exert comparatively less friction to the inner wall of the hollow waveguide, the reflective mirror layer, and/or to the concentrating coating provided thereon, thus reducing wear and improving useful life-time of the sensor system, e.g. without losing essential functionality of the concentrating coating and/or of the reflective mirror layer.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 4A illustrates a perspective view of an exemplary sensor system;

FIGS. 4B and 4C illustrate perspective views of exemplary sensor systems;

DESCRIPTION OF EMBODIMENTS

Figure 1A:
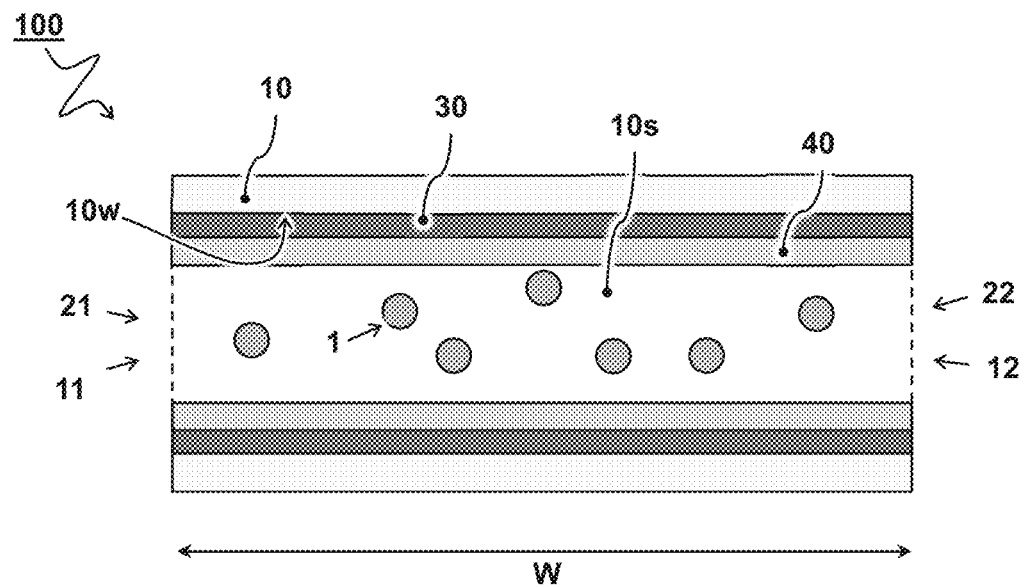
FIGS. 1A and 1B illustrate cross-section side views of exemplary sensor systems.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Aspects of the present disclosure relate to a system sensor system for detecting a presence and/or concentration an analyte a medium. The device, e.g. as shown in FIGS. 1-2, comprises a hollow waveguide 10 which may be understood to comprise: a gas inlet 21 and a gas outlet 22, defining a gas flow path GP for guiding the gaseous medium (G) between the gas inlet 21 and the gas outlet 22; and a light inlet 11 and a light outlet 12 that are provided on opposite (terminal) ends of the hollow waveguide 10. The light inlet and outlet 11,12 are respectively arranged for in-coupling of light L from a light source 101 into the hollow waveguide 10 and for out-coupling of the light L from the hollow waveguide 10 towards a light detector 102. At least part, preferably essentially all, of the inner surface 10s of the hollow waveguide 10 between the light inlet 11 and the light outlet 12 is coated with a reflective mirror layer 30, for reflecting at least a portion of the in-coupled light (L), thus forming a light path (LP) between the light inlet 21 and the light outlet 22 that at least in part coincides with the gas flow path (GP). Further, a concentrating coating 40 of an analyte sorption material 41 is provided along at least a part of the reflective mirror layer such that at least a portion of the light path (LP) overlaps with the concentrating layer 40. This allows the light (L) to interact with a adsorbed analyte 1.

FIGS. 1s A and B illustrate embodiments of sensor systems 100 each comprising a hollow waveguide 10. The sensor systems 100 can be used in optical detection of one or more target analyte 1. Shown within the hollow waveguide 10, bound by opposing inner wall 10w sections is a elongate interior space 10s. Both images depict a cross-section side view along the length of the elongate interior space 10s. Provided to the inner wall 10w is a reflective mirror layer 30. Provided on the reflective mirror layer 30 is a concentrating coating 40. The hollow waveguide 10 provides a gas flow path GP between the gas inlet 21 and the gas outlet 22 for guiding the medium through the elongate interior space 10s (see dash-dotted line in FIG. 1B). The hollow waveguide 10 also provides a light path LP for guiding light L, e.g. light from light source 101, from the light inlet 11 through the elongate interior space 10s to the light inlet 11, e.g. towards a light detector 102 (see dotted line in FIG. 1B).

The sensor system 100 typically comprises a light source 101 for generating light L and a detector 102 for measuring an absorbance of the light along with the hollow waveguide 10. Preferably, infrared light is used. Advantageously use of IR, preferably MID-IR, allows many analytes to be characterized due to a presence of specific bonds vibrating and interacting with the IR at characteristic energy Mid IR may be understood to relate to light having a wavelength in a range from two and a half to twenty five micrometer (approx. 4000-400 $cm^{-1}$). Alternatively, or in addition, the system may be arranged to use light in the near infra read (NIR) region of the electromagnetic spectrum (approx. 700 to 2500 nm).

Advantageously, a concentration (level) of an analyte can be determined from an absorption intensity of a characteristic peak position. Accordingly, the light source 101 and detector 102 are respectively preferably arranged for emitting and detecting of IR light. In some embodiments, the sensor system 100 is arranged as an FTIR system. Typically the system is provided with a controller (not shown). The controller can control, e.g. switch, the light source 101 and or the detector 102. Optimally, the controller may be integrated with the light source and/or detector. Preferably, the controller is arranged for recording and/or analyzing a detector output signal such as absorption spectra, e.g. MIR infrared spectra. Preferably, the sensor system 100 is a portable system. Providing a portable system allows determining air and/or water quality at a site of interest, e.g., at a lake side. To this end the light source 101 and/or the detector 102 are preferably battery operated, e.g., comprise a battery arranged to sustain autonomous operation for a period at least longer than a detection time, e.g., a time of at least one hour. Alternatively, or in addition non dispersive IR methods can be applied, e.g. by using a broadband light source, a detector and optical filters to guide the light into and out of the elongate interior space 10s. More preferably, the sensor system 100 is a wearable system, suitable for personal monitoring applications.

As shown in FIG. 1A, opposing terminal ends of the hollow waveguide 10 can be left open to provide the elongate interior space 10s with a light inlet 11, a light outlet 12, a gas inlet 21 and a gas outlet 22. Preferably, the elongate interior space 10s has a length (W) of at least 1 cm, preferably more, e.g. in excess of 2 cm or more, e.g. 3 or 5 cm. The longer the length, the longer the available interaction pathlength between the light and any target analytes, if present, and the higher a detected signal to noise ratio of a detected output can be. It will be understood an upper limit of the length may be defined by an attenuation of light travelling within the elongate interior space 10s. The longer the elongate interior space 10s the more light intensity may be lost between inlet and outlet, e.g. due to scattering and/or a specific absorption processes. Typically, the length (W) does not exceed 100 or 50 cm. Preferably, the length is less, e.g. about 5 to 20 cm as this improves portability of the sensor system 100. In some embodiments, the hollow waveguide 10 can be formed of a hollow fiber, e.g. a commercially available fiber such as a hollow polymer fiber, a hollow metal fiber or a hollow silica fiber, such as a glass fiber or tube. Preferably, the fiber is a flexible hollow fiber, e.g. a hollow silica fiber. Smaller diameter waveguides, e.g., in a range between fifty and two hundred micrometer can advantageously reduce flexural stiffness. In a preferred embodiment, flexural rigidity of the hollow fiber is such the hollow waveguide 10 can be bent over a diameter of less than five cm or less, e.g., three cm, such as in a range between four and 0.5 cm, without essentially losing functionality of the hollow waveguide 10 and its coating layers. Flexing the hollow waveguide 10 can allow manufacturing of an optical sensing element 10 having a reduced form-factor, e.g., a coil, improving portability of the sensor system 100. In other embodiments, e.g. as described in relation to FIGS. 4B-C and 5A, the hollow waveguide 10 is formed by an elongate groove that is patterned in one or more solid body members.

Figure 1B:
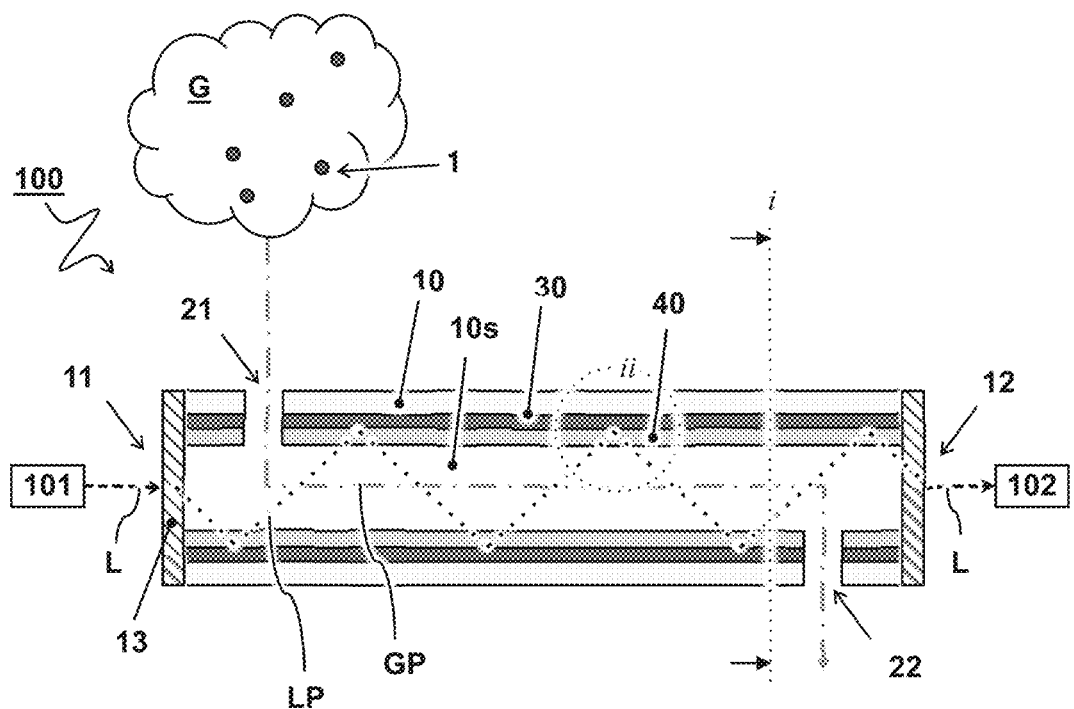

Preferably, the light inlet 11 and light outlet 12 are each provided on opposing ends of the elongate interior space 10*s* with the light path (LP) there between. In some preferred embodiments the gas and light inlet are the same inlet (one opening, e.g. as shown in FIG. 1A). In other or further preferred embodiments the gas and light outlet are the same outlet (e.g. another opening, opposite the inlet opening, e.g. as shown in FIG. 1A). Having the gas and light enter, respectively leave the elongate interior space 10*s* at the same positions maximizes the distance over which the light path (LP) and the gas flow path (GP) overlap, increasing analyte-light interaction. In other or further preferred embodiments, e.g. as shown in FIG. 1B, the gas inlet 21 and the gas outlet 22 are provided as separate openings, e.g. through the inner wall 10*w* of the hollow waveguide 10, each at a position near the opposing ends of the elongate interior space 10*s*. Providing the gas inlet/outlet separate from the light inlet/outlet allows connecting the hollow waveguide 10 to dedicated optical fibers, e.g. commercial multimode fibers, guiding light from a light source 101 into the elongate interior space 10*s* via a first fiber and towards a light detector 102 via a second fiber. Optionally the gaseous medium G may be allowed to enter/leave the elongate interior space 10*s* via a single opening, e.g. via diffusion. Embodiments with two or more gas openings are preferred as the gaseous medium (G) can be actively guided along the gas flow path (GP) e.g. by a pump. Optionally, the light inlet 11 and/or light outlet 12 may be formed of window of a an optically transparent material 13 allowing the light to respectively enter/leave the elongate interior space 10*s* while not allowing the gaseous medium (G) to pass. It will be understood that such embodiments comprise one or more separate gas inlet/outlet openings.

In some preferred embodiments, the light is guided to and from the elongate interior space 10*s* with optical fibers, e.g. dense glass fibers. Use of optical fibers advantageously allows using the hollow waveguide 10 in combination with an external light source and/or light detector. Use of an optical inlet fiber 111 and/or an optical outlet fiber was found to result in particularly good in-coupling and/or out-coupling of light. Use of optical fibers can obviate a need for mirrors and/or lenses to couple light in and out of the hollow wave guide 10. Use of optical fibers can further allow minimizing a gap distance in the light path LP between light source and light detector and accompanying losses, e.g. on in- or out coupling of light. In some embodiments, the light inlet 11 and outlet 12 of the hollow waveguide are arranged to receive an optical fiber. Preferably, the diameter of the respective optical fibers matches an inner diameter e.g. width of the hollow wave guide. Preferably the diameter of the fiber is no less than 0.5 times a diameter of the elongate interior space 10*s* of the waveguide, more preferably no less than 0.75 times the diameter. The better the diameter of the fiber matches the inner diameter of the hollow wave guide the more effectively light may be coupled into or out of the elongate interior space 10*s*.

The reflective mirror layer 30 confines the light within the elongate interior space 10*s* and guides the light L from light inlet 11 towards light outlet 12 while minimizing attenuation of light, e.g. due to interaction thereof with the inner wall 10*w* of the hollow waveguide 10. Advantageously, provision of the reflective mirror layer 30 elongates the length of the light path (LP) for a given length elongate interior space as light is allowed to repeatedly bounce between opposing portions of the mirror layer before leaving the elongate interior space. Preferably, the reflective mirror layer 30 covers essentially the entire distance between the light inlet 11 and the light outlet 12. Gaps, e.g. areas of the inner wall 10*w* not coated with a reflective mirror layer 30 may negatively as affect light transmission through the hollow waveguide 10, e.g. due to scattering and/or absorption. Therefore, such gaps e.g. gas inlet and/or outlet, are preferably dimensioned smaller than 2 mm, preferably less, e.g. below 1 mm such as 0.5 mm. The higher the reflectance of the reflective mirror layer 30 the higher the lower the overall attenuation. The higher the reflectance of the reflective mirror layer 30 the higher intensity of light, e.g., IR light from the light source 101, that can reach the light outlet 22 and a light detector 102 coupled thereto. Preferably, the average reflectance $R_{avg}$ is at least 80%, preferably more up to 100%, at least for the relevant wavelengths of the light (L), e.g. at MID-IR. More preferably, $R_{avg}$ is at least 90%. Most preferably, $R_{avg}$ is at least 95%. Preferably, the reflective mirror layer 30 has low surface roughness. The lower the roughness, the lower nonspecific reflection, e.g. backward reflection, can be and/or the higher the intensity of light reaching the light outlet 22 can be. The surface roughness of the reflective mirror layer 30 is at least less than the wavelength of the light $\lambda/1$ that is used for sensing, e.g. less than about two micrometers. Preferably, the mirror has a flatness better than $\lambda/10$, more preferably the flatness is better than $\mu/20$, such as $\lambda/50$ or $\lambda/100$. It will be understood that the inner wall 10*w* of the hollow waveguide 10 preferably has similar flatness. Metallic layers were found to provide suitable reflectivity, in particular at the MID-IR range. In a preferred embodiment, the reflective mirror layer 30 is preferably a metallic layer, e.g. a silver, gold or aluminum layer.

Figure 2A:
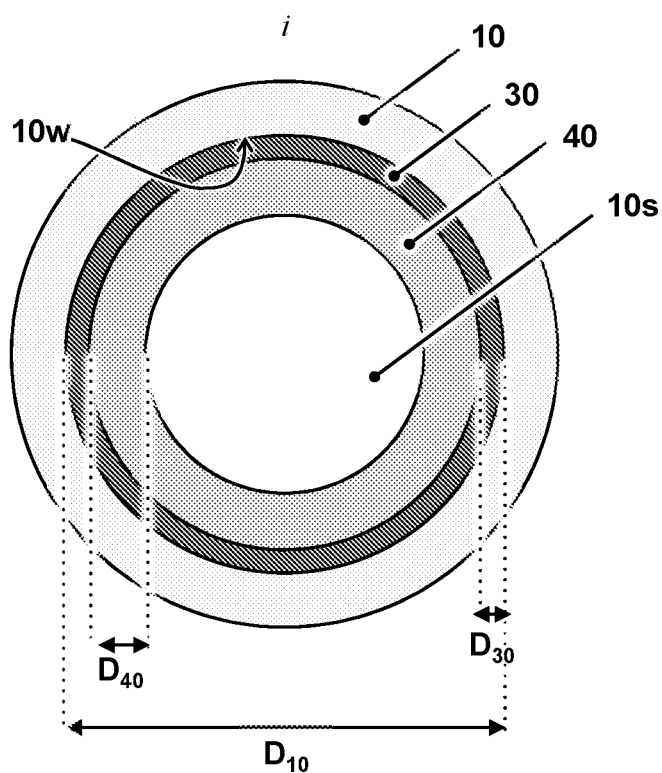
FIGS. 2A and 2B respectively illustrate a cross-section side view and a detailed partial view of exemplary sensor systems.

FIGS. 2A and B illustrate a cross-section side view of exemplary sensor systems. FIG. 2A depicts cross-section along line i as indicated in FIG. 1B showing the hollow waveguide 10 and the coating layers including the reflective mirror layer 30 and the concentrating coating 40 as provided onto the inner wall 10*w* of the hollow waveguide 10. The inner diameter $D_{10}$ of the hollow waveguide 10 is at least larger enough to hold the coating layers. Typically the inner diameter $D_{10}$ of the hollow waveguide is in a range between one hundred micrometers and five millimeter or more, e.g. in a range between one halve and two millimeters. The reflective mirror layer 30 is preferably just thick enough to provide the reflective properties as specified herein. Thicker mirror layers do not contribute to sensor performance. Typically, the thickness $D_{30}$ of the reflective mirror layer 30 is in a range between fifty nanometers and one hundred micrometers, e.g. in a range between one hundred nanometers and ten micrometers, e.g. one micrometer. The thickness $D_{40}$ of the concentrating coating 40 was found to correlate to sensor performance; thicker coatings can accommodate (adsorb) larger amounts of target analyte 1, increasing an effective concentration thereof. Typically the concentrating coating 40 has an average thickness $D_{40}$ of in a range of one to one hundred micrometer. It will be understood that, although the concentrating coating 40 is preferably provided essentially along the whole length of the elongate interior space 10s, the coating need not necessarily be of uniform thickness. Variations in thickness and even small uncoated portions along the reflective mirror layer 30 may be tolerated. Preferably, the concentrating coating 40 is highly porous. A porous material, preferably having an interconnected network of micropores, advantageously has increased available analyte binding sites per unit volume compared to similar dense materials. Provision of an interconnected network of micropores advantageously improves accessibility of binding sites to the gaseous medium G and target analyte 1, if comprised therein, thus reducing response time. Preferably, the concentrating coating has a specific surface area (Brunauer-Emmett-Teller (BET)) of at least 100 $m^2/g$, or more, e.g. in a range between 200 and 2000 $m^2/g$ or more as determined by ISO standard 9277.

Figure 2B:
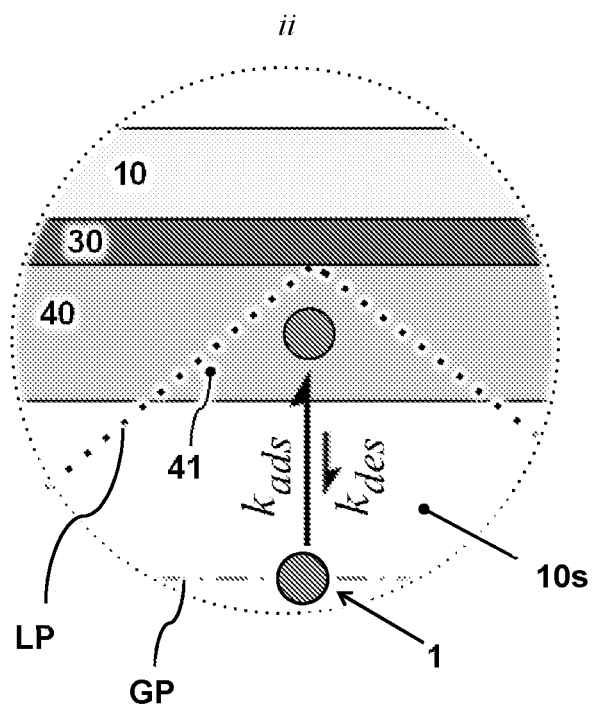

FIG. 2B depicts a detailed partial view of a sensor system 100 at an area ii (as indicated in FIG. 1B). FIG. 2B illustrates a target analyte 1 adsorbing onto and desorbing from the concentrating coating 40. Preferably, the concentrating coating 40, is configured to adsorb, e.g., bind, the target analyte. A high affinity for binding an analyte may be expressed in terms of a binding or adsorption constant ($k_{ads}$), being at least a factor ten higher than a desorption constant ($k_{des}$). Preferably, the adsorption constant is at least a factor one hundred or more, e.g., at least one thousand, higher than the desorption constant. Advantageously, absorbing the analyte effectively increases the target analyte concentration from a comparatively lower concentration in a testing medium G, e.g., ambient air, to a higher concentration at the coating. Concentrating the analyte 1 may improve a signal to noise value at the detector 102. Preferably, the concentrating coating 40 is configured to concentrate the analyte by at least a factor of one hundred, preferably more, e.g., one thousand or one hundred thousand, e.g., in a range between one hundred and one million. Preferably, the coating 12 is further configured to specifically bind one class of analytes, e.g., phosphates or phosphonates, over another class of analytes, e.g., alkanes. Preferably, the concentrating coating 40 is essentially inorganic or nature. That is, the concentrating coating 40 is preferably formed of an inorganic material 41. Inorganic materials can be understood to include oxides and/or hydroxides of metals and/or metalloids, such silica and alumina. Analyte sorption can be a result of analytes interacting, e.g. binding, with surface oxides and/or hydroxides on such materials. By using a an inorganic sorption material that is essentially free of polarizable organic functional groups interaction of the coating in relevant spectral regions (e.g. within mid IR) can be minimized. Reducing light absorption within the coating was found to reduce interference (e.g. overlap) of the coating with analyte specific absorption bands, thus improving sensor performance, lowering detection limits and/or detecting a specific target analyte in a sample comprising a complex mixture gasses or vapors each having specific absorption characteristics. Ceramic and/or inorganic sorption materials 41 may be particularly suitable, as a relative abundance of organic groups that is in a range below ten weight percent, preferably less, e.g., below five weight percent (wt %) or below one wt % (based on total weight of the concentrating coating 40), advantageously mitigates spectroscopic interference of organic constituents of the coating with an obtained spectrum of a target analyte.

It will be understood that the exact type of inorganic sorption material 41 to be used depends on the application and/or type of analyte that is to be detected. Depending on a target analyte various inorganic coating materials, e.g., ceramic materials, may be employed. Preferably, the inorganic sorption material 41 comprises zirconium oxide and/or porous silicon oxide and/or porous aluminum oxide or combinations thereof, such as zeolites, porous glass, porous quartz, porous mullite or porous zirconium oxide. Particularly, inventors envision a use of porous fully ceramic coatings, e.g., zeolites, the pores of which provide a size-depended analyte affinity. For example, the concentrating coating 40 may be formed of a material, e.g. a zeolite, that comprises pores dimensioned to adsorb specific volatile organic vapor compounds such as BTEX (benzene, toluene, ethylbenzene, xylene, and optionally also aldehyde). As such the sensor system 100 may be used to monitor indoor air quality. Optionally, analyte affinity can be tuned by interaction promotors, e.g., self-assembled monolayers. In other or further embodiments, the inorganic material 41 may comprise porous partly organic coatings, e.g. Metal Organic Frameworks, the pores of which are likewise known to provide a size-depended affinity for certain analytes. Optionally, analyte affinity can be tuned by interaction promotors, e.g., self-assembled monolayers.

In some embodiments, the sensor system (100) can be used to detect and/or determine a concentration of a particular analyte in a medium comprising a mixture or plurality of different analytes. As described herein the spectroscopic detection, in particular in the MID-IR regime, was found to enable simultaneous detection (identification) and determination of a concentration of one or more target analytes. In this regard, sorption coatings that comprise or that are essentially formed of zeolites were found advantageous for detecting a presence and determining an amount of one or more of: hydrogen sulfide ($H_2S$), carbon monoxide (CO), carbon dioxide ($CO_2$), oxygen ($O_2$), ammonia ($NH_3$), and water ($H_2O$).

Inventors find that zirconium oxide ($ZrO_2$), zirconium hydroxide or a combination thereof has a particular high affinity for oxides of group-V elements (pnictogens). Compounds found to bind include, but are not limited, to phosphates, phosphonates (C—PO(OR)$_2$ where each R may individually be an alkyl or aryl group), and arsenates, such as organophosphates (also known as phosphate esters) and organo-arsenates including many insecticides, fungicides, herbicides, nerve agents, and flame retardants. Accordingly, in a preferred embodiment the concentrating coating 40 comprises zirconium oxide ($ZrO_2$), zirconium hydroxide or a combination thereof. Binding of pnictogens was found to take place both liquid and in gas phase. Furthermore, binding was found to be reversible in both phases. Regeneration in the gas phase (release of gas or vapor phase analytes) was found to be fast and essentially complete, e.g., within one hour or even within on minute at all humidity levels. In one embodiment, the optical sensing element is regenerated within several seconds by exposing it to clean gas, e.g. ambient air, at an increased relatively high relative humidity. A high relative humidity can be understood as a relative humidity in excess of ninety percent (at twenty five degrees Celsius), preferably in excess of ninety five percent up to one hundred percent. Preferably, the conductions are such as that there is essentially no condensation (below the dew point as to prevent water droplet formation as liquid droplet may block the elongate interior space 10s. Regeneration (desorption) in a liquid medium was found to be slower. Exposing the concentrating coating 40 after contact with analytes to a liquid medium, e.g., water, having a lower level of analytes, preferably an essentially zero level of analytes, was found to reduce a level of bound analyte, although very slow. Under alkaline conditions (pH>9) regeneration was found to be faster.

Figure 3A:
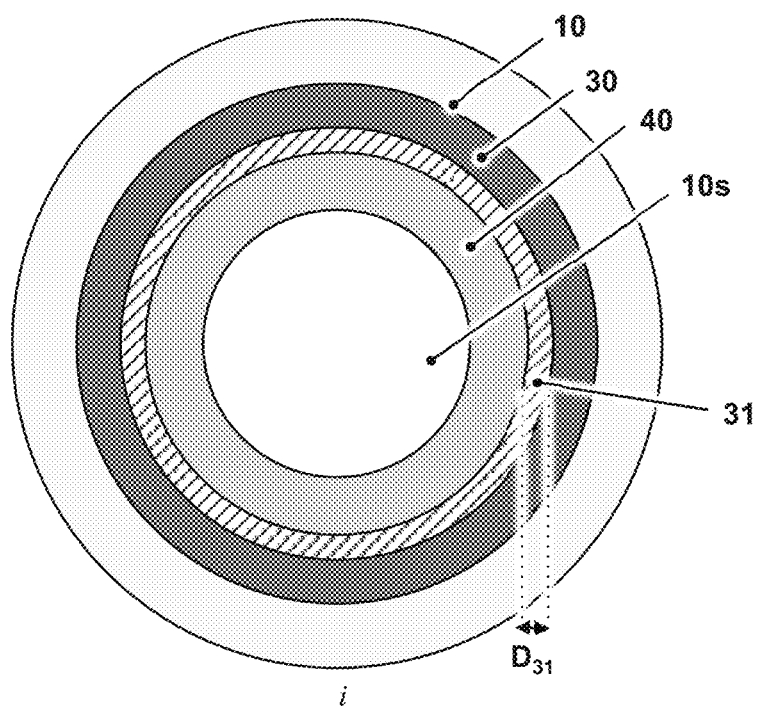
FIG. 3A illustrates a cross-section side view of an exemplary sensor system.

In another or further preferred embodiment, e.g. as illustrated in FIG. 3A, the device 100 comprises a corrosion protection layer 31 that is provided along the reflective mirror layer 30 to protect the underlying mirror layer from corrosion, e.g. as a result of prolonged exposure to humidity and/or oxygen. Preferably, the corrosion protection layer essentially covers the reflective mirror layer 30. Similar to the concentrating coating 40 the corrosion protection layer 31 is preferably transparent to light at analyte relevant wavelength ranges, preferably across the MID-IR range. In principle, the corrosion protection layer 31 can be formed of any suitable corrosion protection material including but not limited to metal oxide, silicon oxide, aluminum oxide or mixtures thereof. The thickness $D_{31}$ of the corrosion protection layer is at least sufficient to provide an effective corrosion protection. Methods confirming corrosion protection are known in the field and may include measuring reflectivity of the underlying reflective mirror layer 30. Typically the thickness $D_{31}$ of the corrosion protection layer 31 is in a range between one and five nanometers. Thicker layers are possible but are not preferred as the corrosion protection layer 31 in itself is believed to not contribute to sensor system output. Advantageously the corrosion protection layer 31 may comprise, or be formed of, an oxide layer, e.g. a native oxide layer, of the material forming the reflective mirror. For example, for a chromium-based mirror layer the corrosion protection layer 31 may be chromium oxide layer (skin), e.g. a native oxide layer. In some preferred embodiments, e.g. wherein the reflective mirror layer 30 is a metallic silver layer, the corrosion protection layer 31 was found to preferably comprise, or essentially consist of, a silver halide layer. Silver halides, preferably AgBr, AgI, AgCl, or a combination thereof, were found to advantageously combine low optical loss properties and low water solubility, providing a protective sheet that reduces corrosion of an underlying metallic mirror layer, by shielding it from water and/or oxide. Provision of a silver halide corrosion protection layer onto a silver mirror was found to serve a dual purpose. In addition to providing corrosion and/or erosion protection, the silver halide was found to increase the reflectivity of the mirror. The increase in reflectivity is believed to be caused by an optimized refractive index, e.g. an suitable refractive index in combination with the specified layer thickness.

Figure 3B:
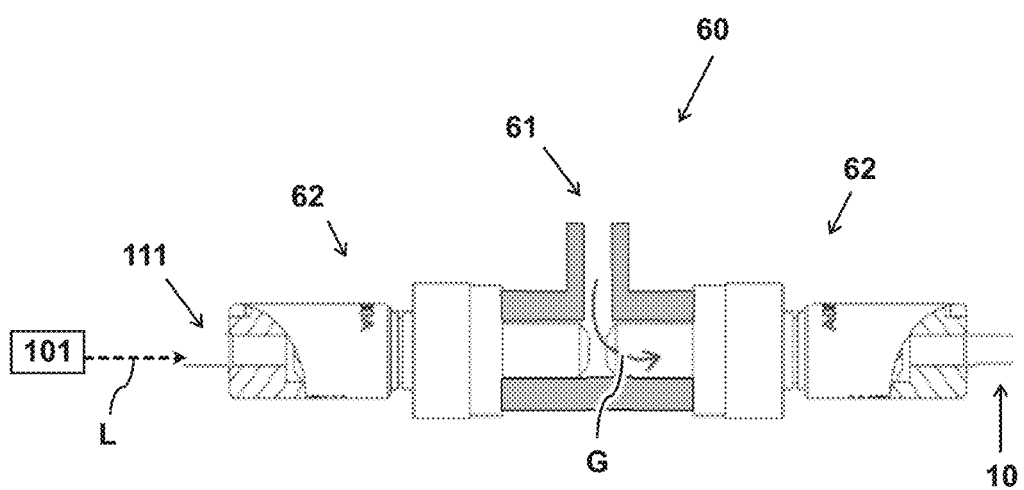
FIG. 3B illustrates a partial cross-section side view of an exemplary sensor systems.

In other or further preferred embodiments, e.g. wherein the opposite terminal ends of the elongate interior space 10s are respectively provided with a shared gas and light inlet and a shared gas and light outlet, the sensor system, comprises a coupling adapter 60. The coupling adapter is arranged to be coupled from a first terminal end to a terminal end of the hollow waveguide. When connected the adapter provides a fluid connection to the elongate interior space 10s. At a second terminal end, opposite the first end the adapter is arranged to receive an optical fiber to guide light L into or out of the elongate interior space 10s of the sensor system 100. FIG. 3B illustrates a partial cross-section side view of an exemplary sensor system comprising an adapter 60 that is coupled to one terminal end of the hollow waveguide 10. The sensor system 100 can include a further adapter 60 that is reversible coupled to the other terminal end of the hollow waveguide 10 (not shown). The coupling adapter comprises an interior space that, when connected, provides a fluid connection (is fluidly connected) to the elongate interior space 10s. In a preferred embodiment, e.g. as shown, the coupling adapter comprises a first connector 62 for reversibly receiving a terminal end of the hollow waveguide 10 and a second connector 63, positioned opposite the first connector 62 across the interior space, that is arranged to reversibly receive an optical fiber 111, e.g. a commercial multimode fiber connected to a broadband IR light source 101, thus allowing light from the fiber 111 to be coupled into the elongate interior space 10s of the hollow waveguide 10, or vice versa. The adapter preferably includes an gas inlet/out opening 61 provides fluid access to the interior space and that is positioned between the connectors 62,62, thus allowing the gaseous medium (G) to enter/leave the elongate interior space 10s of the hollow waveguide 10. Alternatively or in addition, the hollow waveguide 10 can be provided with an inlet that allows the gaseous medium (G) to enter/leave the elongate interior space 10s.

Figures 4A, 4B, 4C:
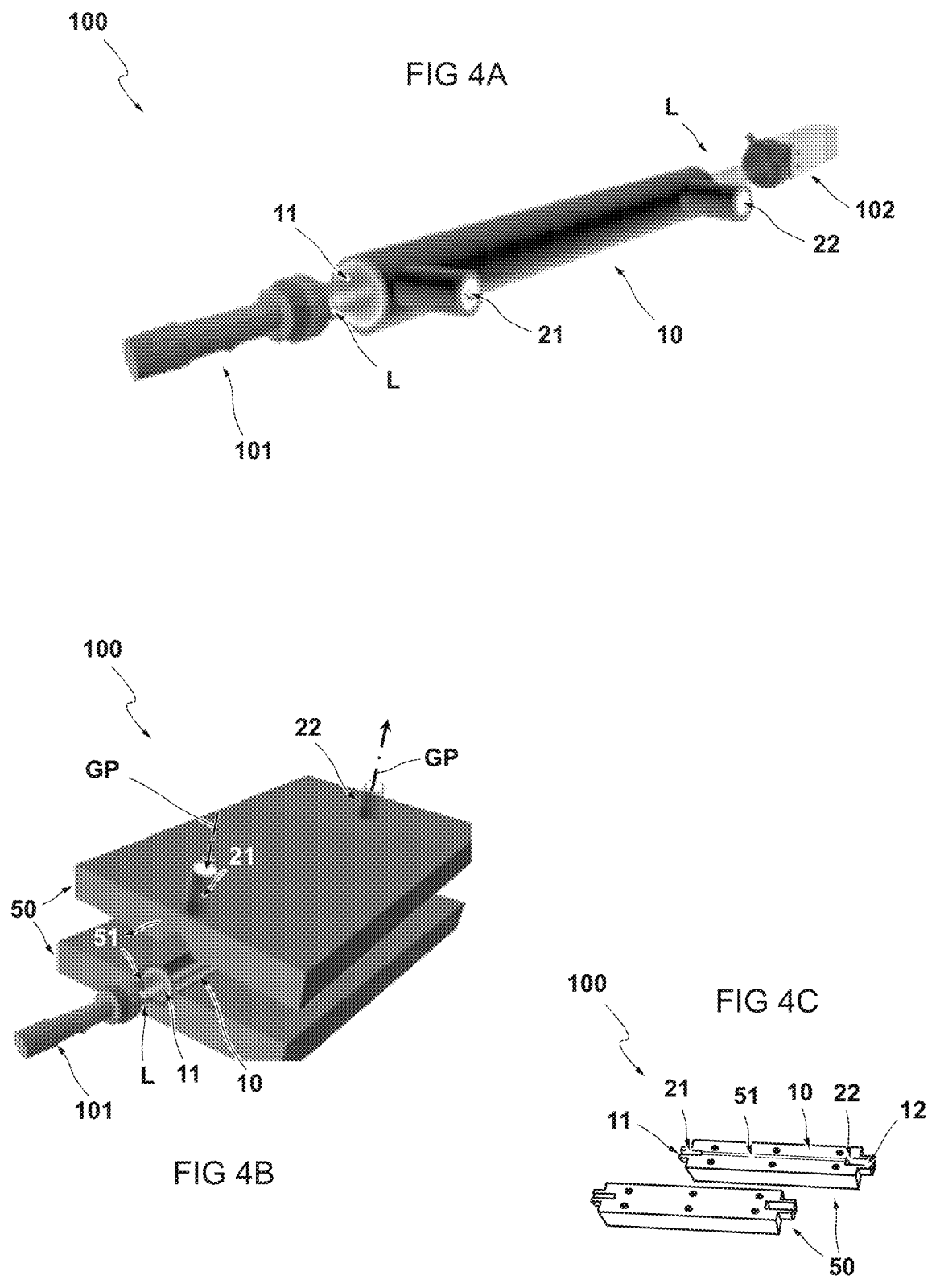
Figure 5A:
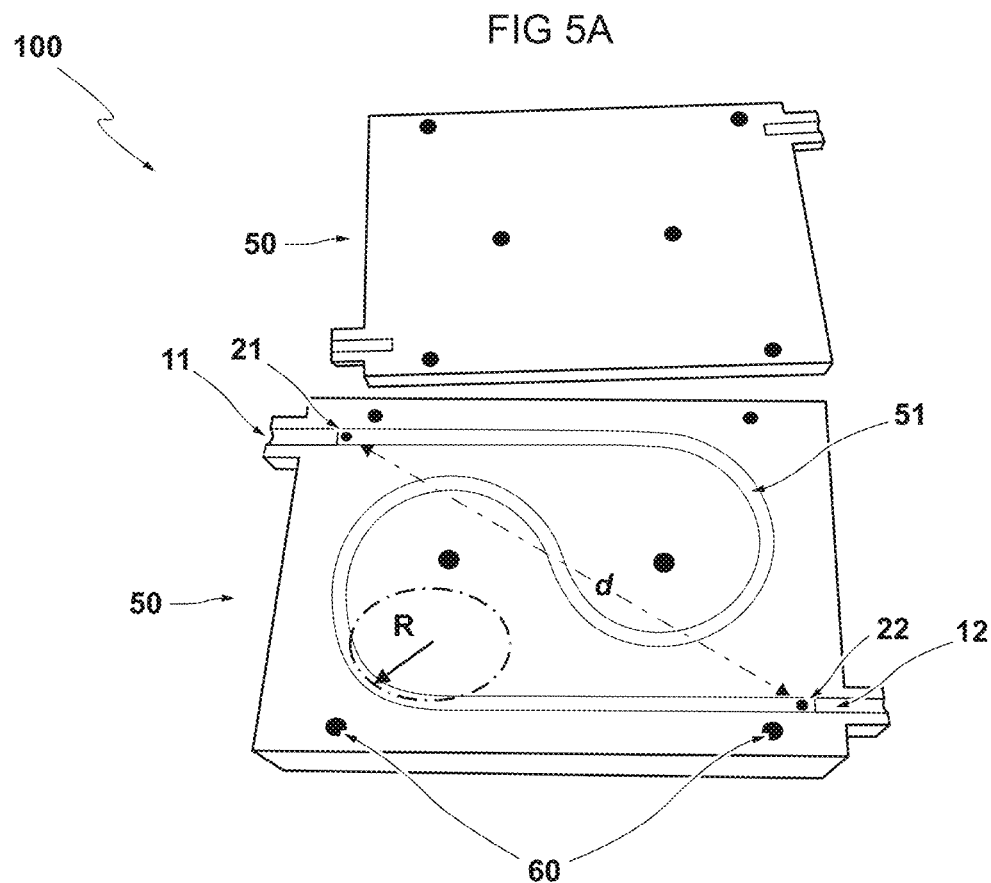
FIG. 5A illustrates a perspective view of an exemplary sensor system.

In some embodiments, e.g. as shown in FIGS. 4B-C and 5A the hollow waveguide 10 is formed by an elongate groove 51 or slot that is patterned in one or more adjacent solid body members 50. In the embodiment as shown in FIG. 4C the hollow waveguide 10 is provided by a groove or slot 51 patterned into a face of a first body member and an unpatented face of a second body member positioned over the groove. In other or further embodiments, e.g. as shown in FIG. 4B, the hollow waveguide 10 is formed by two adjacent body members, each suitably provided with a groove 51. Alternatively or in addition, the groove may be provided, e.g. drilled, trough the bulk of a solid body member. Providing the hollow waveguide 10 between two adjacent body members advantageously allows reversibly opening and closing of the waveguide (channel), e.g. for inspection, maintenance and/or cleaning purposes. Provision of a hollow waveguide 10 that an be opened along the length of the elongate interior space 10s further eases deposition of the reflective mirror layer 30, the concentrating coating 40 or any other or further coatings or layers to the inner wall 10w of the hollow waveguide 10, e.g. during its manufacturing process. In one embodiment, a sealant, such as a thin layer of grease, a rubber ring or coating, may be provided between adjoining body members to improve air-tightness of the hollow waveguide 10. The groove may be formed by any suitable manufacturing method, including but not limited to drilling, milling, etching, and additive manufacturing methods such as 3D printing, or a combination thereof. The groove may have any suitable cross section including but not limited to square or round. The side walls of the groove, are preferably smooth providing the hollow waveguide 10 with an inner wall 10w having a flatness as described herein. Providing the hollow waveguide 10 between two adjacent body members advantageously allows smoothening, e.g. polishing the groove and/or of the reflective mirror layer provides thereon. Using body members formed of an optically reflective material, e.g. a metal such as aluminum, silver or gold, may obviate a need for a providing a separate coating material to inner wall 10w of the hollow waveguide 10.

In some embodiments, e.g. as shown in FIG. 5A, the hollow wave guide 22 is arranged along a meandering trajectory wherein a distance (d) (marking the dash-dot arrow in FIG. 4B) between the light inlet 11 and the light outlet 12 is less than the length of the waveguide by a factor of at least 2. Preferably the radius of curvature R (dash-dot circle in FIG. 5A) is larger than one centimeter along the trajectory. The hollow wave guide 10 is preferably arranged such that the light path is void of local sharp corners or bends <90 degrees such that backward reflections of the light traveling through the hollow wave guide 22 are avoided. By arranging the hollow wave guide 22 along a meandering trajectory a hollow waveguide 10 can be provided which synergistically combines a reduced form factor, with an increased length of the light path (LP) and or gas flow path (GP) while reducing undesired light loss, e.g. due internal reflections.

Figure 5B:
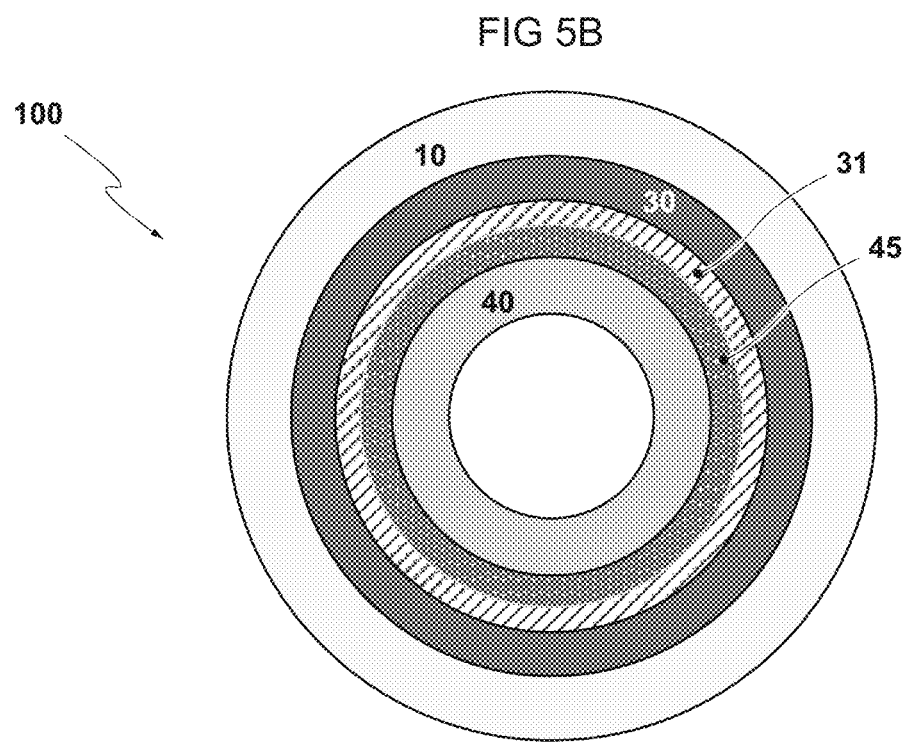
FIG. 5B illustrates a cross-section side view of an exemplary sensor system.

In some embodiments, e.g. as shown in FIG. 5B, the hollow waveguide 10 comprises a adhesion promotion layer 45. The adhesion promotion layer 45 improves adhesion of the concentrating coating 40 to the reflective mirror layer 30, to the corrosion protection layer 31 if present, and/or to the inner wall 10w. In particular, when a concentrating coating 40, formed of an inorganic sorption material 41 as described herein is to be provided atop of a silver of silver halide layer, adhesion between these two layers may be improved by providing adhesion promotion interlayer 45.

Alternatively, or in addition, and adhesion promotion layer may be provided between the inner wall 10w and the reflective mirror layer 30 to improve adhesion of the mirror layer to the waveguide. Incorporation of an adhesion promotion layer 45 can advantageously improve deposition of the concentrating coating 40, improving homogeneity and/or coverage throughout the elongate interior space 10s. Alternatively, or in addition, incorporation of an adhesion promotion layer can advantageously improve operable life-time of the sensor system 100 as it mitigates degradation, e.g. desorption or delamination, of the active sensing layers such as the concentrating coating 40.

The adhesion promotion layer 45 is preferably as thin as possible without essentially losing adhesion promotion functionality. Typically the thickness $D_{45}$ of the adhesion promotion layer 45 is less than three hundred nanometer, preferably less than one hundred nanometer or less than fifty nanometer. More preferably, the adhesion promotion layer 13 is thinner, e.g., having a thickness between one to two monolayers or one nanometer and thirty nanometer, e.g., in a range between one and five nanometer.

According other or further aspects, the present disclosure relates to a method of manufacturing the sensor system and/or the hollow waveguide 10 as disclosed herein. Manufacturing the sensor system comprises at least: providing an hollow waveguide; depositing reflective mirror layer along an inner surface of the hollow waveguide, and depositing an analyte sorption material, preferably an inorganic sorption material, to form a concentrating coating along the reflective mirror layer. As described In some embodiments the hollow waveguide is formed of a hollow fiber whereas in other or further embodiments the hollow waveguide 10 is formed by a groove patterned in one or more solid body members. In principle deposition of the reflective mirror layer 30, concentrating coating 40, and other layers, such as the corrosion protection layer and adhesion promotion layer 45 may be performed by any known suitable means. The reflective mirror layer 30 can be deposited by vapor deposition of suitable metal, e.g. silver, mixture of metals, and/or one or precursors thereof. Vapor deposition methods can be particularly preferred in embodiments wherein the hollow waveguide 10 is formed by a groove patterned in one or more solid body members. For such embodiments vapor deposition may be preceded or followed by one or more polishing steps to reduced roughness of the groove walls (forming the inner wall 10w) and/or the mirror layer formed thereon. If the body member are formed of a reflective metallic material such as aluminum or silver, deposition of a separate reflective mirror layer can be omitted and/or replaced by a polishing step. Vapor deposition within hollow fibers, in particular long fibers, e.g. fibers having a length in excess of one cm may be less preferred. Alternatively or in addition the reflective mirror layer 30 may be deposited by a number of suitable liquid deposition methods including but not limited to electrodeposition and electroless deposition methods. Electroless deposition may be preferred for embodiments wherein the hollow waveguide 10 is formed of a hollow (glass) fiber. Inventors found that a homogenous silver mirror layer of sufficient thickness can be conveniently deposited by exposing an inner surface of the hollow waveguide 10, e.g. the inner wall 10w, to a Tollen's reagens (e.g. a solvent comprising diamine silver(I) complex and an aldehyde, e.g. glucose).

Inventors found that deposition of the concentrating coating 40 can advantageously can be carried out with a relatively simple wet, e.g., wet-chemical, deposition method that comprises exposing the surface to be covered (e.g. the reflective mirror layer 30) to a liquid phase, e.g., water or another polar solvent, comprising a solution or suspension of an inorganic sorption material 41 or precursor thereto. After drying, e.g., vacuum drying, it was found that the optical waveguide 10 was provided with a layer of the concentrating coating 40. For example, In one embodiment of manufacturing the hollow waveguide 10 comprises exposing an inner surface of the hollow waveguide 10 including a pre deposited reflective mirror layer, to an aqueous dispersion comprising inorganic particles, e.g., zirconium oxide nanoparticles, to form a wet film comprising said nanoparticles, and drying said film to form an adhesion promotion layer with a dry coating of said inorganic articles. Preferably the inorganic sorption material 41 is deposited as a suspension of nanoparticles, e.g., zirconium oxide, alumina, zeolite or other nanoparticles, in a polar dispersant, e.g., water and lower alcohols. Deposition of inorganic or ceramic nanoparticles can advantageously result in the formation of a porous concentrating coating 40. The term nanoparticles may be understood to relate to particulate matter having at least one dimension in a range between one nanometer and one thousand nanometer. Preferably the nanoparticles have an average dimension (d90) within one and five hundred nanometer or within five and two hundred nanometer. Smaller nanoparticles can lead to comparatively denser films having smaller yet a higher number of voids along with a higher overall surface area allowing sorption of more analyte compared to films of comparatively larger particles, e.g., micro particles or compared to films comprising essentially no voids for analyte transport, e.g., dense films. The concentration of particles in suspension can depend on a target thickness $D_{40}$ the concentrating coating 40. A suitable concentration can be determined experimentally, e.g., by measuring thickness of formed films deposited on comparative flat substrates of similar composition. Typically the concentration of nanoparticles is in a range between one and one hundred milligram per milliliter. Alternatively, or in addition, the concentrating coating 40 may be deposited by an in situ synthesis, e.g. from precursors such as zirconium isopropoxide or other metal alkoxides. Alternatively, or in addition, zeolite-based inorganic coatings 12 may be deposited by exposing the surface of the hollow waveguide 10 with reflective mirror layer 30 to an sol-gel process step as known in the field. Further, alternative deposition methods may be understood to include magnetron sputtering, chemical vapor deposition, atomic layer deposition and/or molecular deposition methods. While vapor based deposition methods may be less preferred to coat the interior of an elongate hollow fiber, such methods may be particularly beneficial for manufacturing of embodiments wherein the elongate interior space 10s is formed, e.g. as a groove, in or between one or more solid body members (see e.g. FIGS. 4B-C and 5A).

In some embodiments the method comprises deposition or formation of a corrosion protection layer 31. For a silver based reflective mirror layer formation of the corrosion protection layer 31 can be attained by exposing the silver layer to a halide solution, e.g. an aqueous solution halogen solution such a $I_2$(aq) to convert a top face of the silver layer to the corresponding silverhalide (e.g. AgI) which protects the underlying silver from corrosion.

In some embodiments, the method comprises deposition of a adhesion promotion layer 45. Adhesion and/or homogeneity of deposited concentrating coatings 40 was found to improve when a adhesion promotion layer 45 was provided onto the reflective mirror layer 30 before depositing the inorganic sorption material 41. Preferably, the adhesion promotion layer 45 is configured to provide surface hydroxyl groups for improving adhesion of the concentrating coating 40. For example, the adhesion promotion layer be configured to have surface hydroxyl groups and/or form surface hydroxyl groups after deposition. Alternatively, or in addition, the precursor thereto can be configured to have surface hydroxyl groups, e.g., after conversion to the adhesion promotion layer. Inventors find that application of a coating, e.g., as described herein, can be improved, e.g., yielding more uniform, more reliable and/or more stable (durable) coatings by providing an adhesion promotion layer. Preferably, the adhesion promotion layer is configured to have surface hydroxyl groups for improving adhesion of the concentrating coating 40. In some embodiments, the adhesion promotion layer comprises, or essentially consists of, metalloids, metals, silicon oxides, metal oxides, or mixtures thereof. In a preferred embodiment, the metal is selected from a group of aluminum, chromium, zinc, and titanium. Accordingly, in a preferred embodiment, the adhesion promotion layer comprises an oxide of a metalloid, a metal, an oxide of a metal, or a mixture thereof. Inventors find concentrating coatings 40 as described herein that are deposited on an adhesion promotion layer 45 comprising oxides of metalloids, e.g., silicon oxide, metals, oxides of metals, and mixtures thereof have improved adhesion and/or homogeneity. Preferably, the adhesion promotion layer 45 comprises, or consists essentially of oxides of aluminum, chromium, zinc, titanium, silicon, or mixtures thereof. Oxides, e.g., native oxides layers on dense layers of aluminum, chromium, zinc, titanium, and silicon or combinations thereof, were found to not only provide beneficial adhesive properties but also form a passivation layer, e.g., a skin, protecting the underlying reflective mirror layer 30 from oxidation and/or from direct contact with water. In some embodiments, depositing the adhesion promotion layer 45 comprises depositing a precursor film, e.g. a metal film. The metal film being a precursor to the adhesion promotion layer. After deposition the metal film the method comprises the step of oxidizing said metal film. Oxidation of the metal film can advantageously provide a corrosion protection layer 31, as in the case of aluminum forming a protective oxide sheet. Alternatively, or in addition, oxidation of the metal film, e.g. aluminum can advantageously provide adhesion promotion layer properties. Inventors surprisingly found that a metal oxide or metalloid oxide adhesion promotion layer may advantageously be attained by initial deposition of a metal or metalloid precursor film followed by conversion, e.g., oxidation, of the precursor layer to form the adhesion promotion layer. Deposition of the precursor layer may be attained by any suitable deposition means including but not limited to electro(less) deposition and vapor deposition. Preferably the precursor layer is deposited by vapor deposition e.g., physical vapor deposition, as vapor deposition methods can advantageously be used for homogeneous deposition of a broad range of materials. Following precursor layer deposition the precursor layer is oxidized. Oxidation of the precursor layer converts the film from metallic or metalloid to an oxidic character having adhesive properties as described herein. Alternatively, adhesion layers can be manufactured using silicon alkoxides, aluminum alkoxides or a combination thereof as precursor molecules.

According to a further aspect the present disclosure pertains to the use of the sensor system as disclosed herein for detecting one or more target analyte in a fluid medium. The use comprises at least guiding the medium to be analyzed through the elongate interior space of the hollow waveguide as disclosed herein. The hollow waveguide comprising the reflective mirror layer 30 and the concentrating coating 40 as disclosed herein. The medium can be liquid. Preferably, the medium is a gaseous medium. The use further comprises guiding light L along a light path LP though the hollow waveguide 10. As the light is guided along the light path LP, light can interact with target analyte 1 that, if present in the medium, are adsorbed by the concentrating coating 40. As the concentrating coating increases the effective analytes concentration the sensor system 100 benefits from an increased sensitivity. The use further comprises measuring an absorption, preferably an infrared absorption spectrum, e.g. by light detector 102 with a coupled or integrated controller. Measuring an absorption, e.g. at an analyte specific adsorption peak allows determining a presence and/or a concentration of such analyte, if present in the medium. Measuring an absorption spectrum, preferably an infrared absorption spectrum, most preferably at a MID-IR range, allows identification (characterization) of a specific analyte or a plurality of analytes present in the medium, e.g. a medium comprising a mixture of compounds, e.g. by comparing a recorded absorption spectrum to predetermined reference spectra. The analysis can advantageously be performed in-line (e.g. on site) with a controller such as a computer implemented analysis device comprised in the system. Alternatively, or in addition, recorded data can be stored on a non-transient computer readable storage medium. Preferably, the use also comprise a regeneration step as disclosed herein. Regeneration may be performed prior and/or after an exposure to the gaseous medium to be analyzed. Optionally, regeneration may be performed after a given number of exposure cycles, e.g. after ten exposure cycles. Preferably, regeneration is performed before each measurement cycle. Alternatively, a recording of a previous exposure can be used as base line recording. Regeneration may be understood to include exposing the concentrating coating to a regeneration medium with zero or near zero (negligible) concentration of analyte to be detected, e.g. by flushing clean ambient air or pressurized air through the hollow waveguide. As described above, for a zirconium oxide based concentrating coatings, the regeneration medium is preferably air that as, or is pre-humidified to have, a relative humidity in excess of ninety percent. Optionally or additionally, coatings can be regenerated by exposure to a liquid medium, e.g., water, having a reduced level of analytes, preferably an essentially zero level of analytes. As described above, for zirconium oxide based coatings the liquid medium is preferably an aqueous alkaline solution having a pH in excess of nine. Other and/or further regeneration media, e.g. for other types concentrating coatings such as zeolite or alumina based coatings, may suitably selected from media known to the skilled person. In a preferred embodiment, the concentrating coating is fully reversible, thus allowing desorption of target analytes from the coating following, without the need for separate regeneration steps.

Figure 6A:
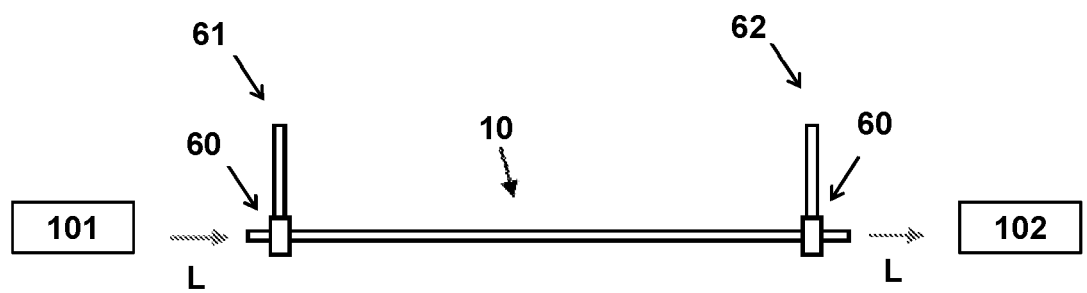
FIG. 6A illustrates an experimental setup of a sensor system.
Figure 6B:
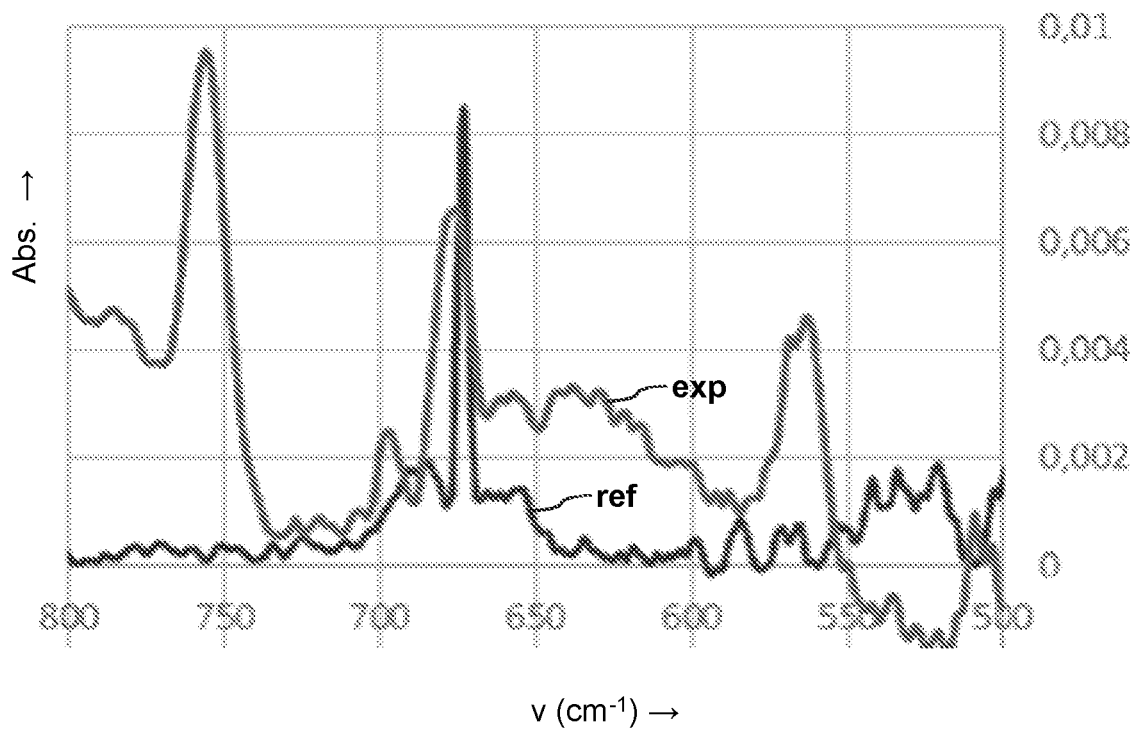
FIGS. 6B, 7A and 7B depict experimental data obtained on a gaseous medium.

The invention will now be elucidated by the following non-limiting example. All data was obtained at 25° C. and at standard pressure. FIG. 6A illustrates an experimental setup use to detect analytes in a medium. Broadband light L of a MID-IR source was guided to and from the hollow waveguide 10 via optical fibers. The hollow waveguide 10 is a 10 cm long hollow silica waveguide that is coated with a silver reflective mirror layer. Connection to the hollow waveguide 10 was made using adapters 60. The adapter, optical fibers and hollow waveguide 10 have matching internal diameter help have minimum light loses. FIG. 6B depicts absorbance (Abs) as function of wavenumber (v/cm$^{-1}$). The FT-IR spectrum marked 'ref' represents a reference experiment recorded for air comprising benzene. Without a concentrating coating a presence of benzene at a concentration down to 10 ppm could be confirmed by detection of an absorption peak at about 675 cm$^{-1}$. The spectrum marked 'exp' represents a recording obtained with a fiber with an inner concentrating coating that is exposed to air comprising 25 ppb of benzene. The concentrating coating is a 400 nm thick zeolite coating that is provided onto the along the length of the elongate interior space of the hollow waveguide. The zeolite coating is made from FAU-Y nanoparticles having a Si/Al ratio of 2.7. The coating was applied from a water dispersion into the fiber. Comparison of the area under the absorption peak, in combination with the path length, and benzene concentrations reveals a 106-fold increase in sensitivity compared to waveguides without a concentrating coating. As shown, there is very little absorbance outside the benzene-specific absorption bands. This demonstrates the effectivity of the silver coating. The absence of interfering absorbance peaks within the spectrum also demonstrates the transparency of the coating.

Figure 7A:
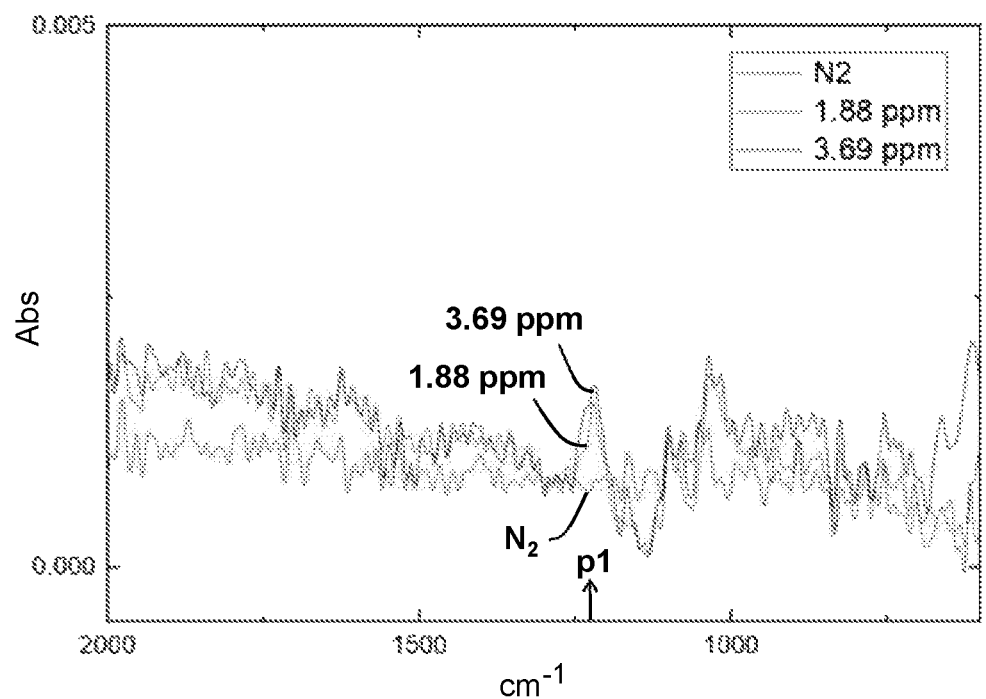
Figure 7B:
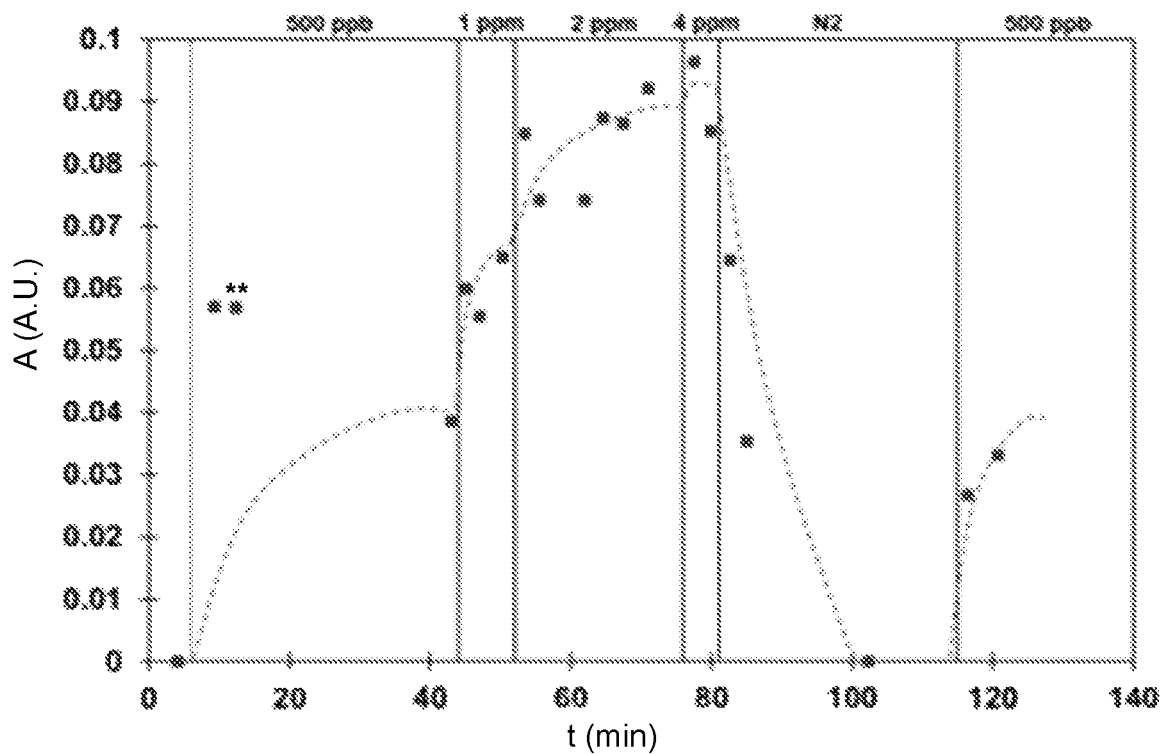

For the detection of hydrogen sulfide, a layer of Na-ZSM5 zeolite was deposited on a substrate. The layer was formed on the substrate, a hollow waveguide, using by deposition from a suspension as disclosed herein. The exposure to various concentrations of $H_2S$ in $N_2$ as carrier gas was done simultaneously with the interrogation using FTIR spectroscopy. FIG. 7A depicts a raw FTIR absorbance spectrum showing the response of a Na-ZSM5 coated HWG to the presence of $H_2S$. An absorption peak (p1) was found at about 1218 cm$^{-1}$, the area of which depends on the concentration of $H_2S$ in the nitrogen carrier gas. After the $H_2S$ was removed from the carrier gas, the peak disappears again. FIG. 7B shows the corresponding response curve depicting the area of the absorption band at 1218 cm$^{-1}$ (in arbitrary units A.U.) as a function of time (t, min) with changing exposure conditions. At time t=0 until about t=8 min the concentration of $H_2S$ in the carrier gas was zero. Vertical lines indicate times at which the concentration of $H_2S$ was switched to respectively 500 ppb, 1 ppm, 2 ppm, 4 ppm, zero ppm ($N_2$), and 500 ppb. The square markers represent selected data points of the area (A). Note that the two data points at about 10 minutes, marked, were identified as outliers. The dashed line indicates the corresponding trend. As can be seen the response was found to scale with the concentration of analyte ($H_2S$) in the medium. Other zeolites, such as H-ZSM5, Ag-EMT, Fau-X, LTA300, NaY, and Ag-ZSM5 have also been assessed and showed comparable results.

For the detection of carbon monoxide, a layer of Na—Y zeolite was deposited on a substrate (HWG). The exposure to various concentrations of carbon monoxide CO was done simultaneously with the interrogation using FTIR spectroscopy. Several absorption peaks appeared around 2000 cm$^{-1}$, the area of which depends on the concentration of CO in the nitrogen carrier gas. After the CO was removed from the carrier gas, the peak disappears again. Other zeolites have also been assessed, such as Na-ZSM5. A coating with a thickness of 1 µm yielded a similar response as a conventional 5 cm long gas exposure cell, indicating an amplification of 50000 times.

For the purpose of clarity and a concise description, features are described herein as part of the same or separate embodiments, however, it will be appreciated that the scope of the invention may include embodiments having combinations of all or some of the features described. Of course, it is to be appreciated that any one of the above embodiments or processes may be combined with one or more other embodiments or processes to provide even further improvements in finding and matching designs and advantages.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A sensor system for spectroscopic detection of a target analyte in a gaseous medium, the sensor system comprising a hollow waveguide having an elongate interior space defining a gas flow path that is confined by an inner wall of the hollow waveguide, the hollow waveguide comprising:
   a reflective mirror layer that is provided along the inner wall of the hollow waveguide, forming a light path for guiding light from a source though the elongate interior space between a light inlet that is provided on one terminal end of the hollow waveguide and a light outlet that is provided on an opposing terminal end of the hollow waveguide;
   a concentrating coating of an inorganic sorption material that is provided onto at least a part of the reflective mirror layer, wherein at least a portion of the concentrating coating overlaps with the light path;

an infrared light source for generating light coupled to the light inlet; and an infrared light detector coupled to the light outlet arranged to record a transmittance spectrum of the light guided through the hollow waveguide, wherein the reflective mirror layer is a silver layer, and wherein the sensor system further comprises:

a silver halide layer between the reflective mirror layer and the concentrating coating; and an interlayer essentially consisting of oxides of one or more of the group consisting of: aluminum, chromium, zinc, titanium, and silicon;

wherein the interlayer is between the silver halide layer and the concentrating coating.

2. The sensor system according to claim 1, wherein the inorganic sorption material is provided as nanoparticles.

3. The sensor system according to claim 1, wherein the inorganic sorption material is essentially comprised of zirconium oxide and/or porous zirconium oxide.

4. The sensor system according to claim 1 wherein the inorganic sorption material comprises one or more materials taken from the group consisting of: porous silicon oxide, porous aluminum oxide, zeolites, porous glass, porous quartz, and porous mullite.

5. The sensor system according to claim 1, wherein the reflective mirror layer is a silver layer, and wherein the hollow waveguide is a hollow fiber having a length in a range between two and twenty centimeters and an interior space having a diameter in a range between 0.5 and five millimeters.

6. The sensor system according to claim 1, comprising a coupling adapter that is arranged to be coupled from a first end to a terminal end of the hollow waveguide and that, when connected, provides a fluid connection from an inlet to the elongate interior space, and that is arranged to receive an optical fiber from a second end, opposite the first end, to guide light into or out of the elongate interior space.

7. The sensor system according to claim 1, wherein the light source is a broadband infrared light source, and wherein the system comprises a controller for recording and/or analyzing a light detector output.

8. A method of manufacturing a sensor system for spectroscopic detection of a target analyte in a gaseous medium, the sensor system comprising a hollow waveguide having an elongate interior space defining a gas flow path that is confined by an inner wall of the hollow waveguide, the hollow waveguide comprising:

a reflective mirror layer that is provided along the inner wall of the hollow waveguide, forming a light path for guiding light from a source though the elongate interior space between a light inlet that is provided on one terminal end of the hollow waveguide and a light outlet that is provided on an opposing terminal end of the hollow waveguide;

a concentrating coating of an inorganic sorption material that is provided onto at least a part of the reflective mirror layer, wherein at least a portion of the concentrating coating overlaps with the light path;

an infrared light source for generating light coupled to the light inlet; and an infrared light detector coupled to the light outlet arranged to record a transmittance spectrum of the light guided through the hollow waveguide wherein the method of manufacturing comprises:

providing the hollow waveguide;

depositing the reflective mirror layer along the inner wall of the hollow waveguide; and depositing inorganic sorption material to form the concentrating coating along the reflective mirror layer, wherein the reflective mirror layer is a silver layer, and wherein the method further comprises:

depositing a silver halide layer between the reflective mirror layer and the concentrating coating; and depositing, prior to depositing the inorganic sorption material, an interlayer essentially consisting of oxides of one or more of the group consisting of: aluminum, chromium, zinc, titanium, and silicon;

wherein the interlayer is between the silver halide layer and the concentrating coating.

9. The method according to claim 8, wherein the depositing inorganic sorption material comprises contacting the hollow waveguide with a suspension comprising a material taken from the group consisting of: zirconium oxide, silicon oxide, aluminum oxide, and zeolite nanoparticles.

10. The method according to claim 8, wherein the depositing inorganic sorption material comprises contacting the hollow waveguide with a solution comprising one or more precursors to one or more materials taken from the group consisting of: zirconium oxide, silicon oxide, aluminum oxide, and zeolite.

11. The method according to claim 8, wherein depositing the interlayer comprises:

depositing, as a precursor film, a metal or metalloid film to the interlayer, and oxidizing the precursor film.

12. A method of performing spectroscopic detection of a target analyte in a gaseous medium, wherein the method comprises use of a sensor system for spectroscopic detection of a target analyte in a gaseous medium, the sensor system comprising a hollow waveguide having an elongate interior space defining a gas flow path that is confined by an inner wall of the hollow waveguide, the hollow waveguide comprising:

a reflective mirror layer that is provided along the inner wall of the hollow waveguide, forming a light path for guiding light from a source though the elongate interior space between a light inlet that is provided on one terminal end of the hollow waveguide and a light outlet that is provided on an opposing terminal end of the hollow waveguide;

a concentrating coating of an inorganic sorption material that is provided onto at least a part of the reflective mirror layer, wherein at least a portion of the concentrating coating overlaps with the light path;

an infrared light source for generating light coupled to the light inlet; and an infrared light detector coupled to the light outlet arranged to record a transmittance spectrum of the light guided through the hollow waveguide, wherein the reflective mirror layer is a silver layer, and wherein the sensor system further comprises:

a silver halide layer between the reflective mirror layer and the concentrating coating; and an interlayer essentially consisting of oxides of one or more of the group consisting of: aluminum, chromium, zinc, titanium, and silicon;

wherein the interlayer is between the silver halide layer and the concentrating coating.

13. The method according to claim 12, wherein the method of performing spectroscopic detection of a target analyte comprises:

guiding the gaseous medium through the hollow waveguide;

guiding light from a broadband infrared light source coupled into the hollow waveguide through the hollow waveguide;

recording a transmittance spectrum of the light guided through the hollow waveguide with the infrared light detector to determine a presence of the target analyte in the gaseous medium.

\* \* \* \* \*